United States Patent
Nichols et al.

(10) Patent No.: US 8,078,534 B1
(45) Date of Patent: Dec. 13, 2011

(54) CASH SUPPLY CHAIN SURVEILLANCE

(75) Inventors: Michelle Nichols, Rock Hill, SC (US);
Todd Atwood, Charlotte, NC (US);
James Heddleson, Charlotte, NC (US);
Steve Cargle, Denver, NC (US)

(73) Assignee: Bank of America Corporation, Charlotte, NC (US)

(*) Notice: Subject to any disclaimer, the term of this patent is extended or adjusted under 35 U.S.C. 154(b) by 274 days.

(21) Appl. No.: 12/262,448

(22) Filed: Oct. 31, 2008

Related U.S. Application Data

(60) Provisional application No. 61/061,987, filed on Jun. 16, 2008.

(51) Int. Cl.
*G06Q 40/00* (2006.01)
*G07K 7/04* (2006.01)
*G08B 5/00* (2006.01)
*G09B 9/00* (2006.01)

(52) U.S. Cl. .......... 705/39; 235/379; 194/207; 340/825; 340/49; 348/143

(58) Field of Classification Search .................. 705/37
See application file for complete search history.

(56) References Cited

U.S. PATENT DOCUMENTS

| | | | |
|---|---|---|---|
| 3,618,059 A | 11/1971 | Allen | |
| 4,352,097 A | 9/1982 | Hamann | |
| 4,443,692 A | 4/1984 | Nishimura | |
| 5,453,601 A | 9/1995 | Rosen | |
| 5,689,240 A | 11/1997 | Traxler | |
| 5,748,906 A | 5/1998 | Sandig | |
| 5,952,920 A | 9/1999 | Braddick | |
| 5,953,423 A | 9/1999 | Rosen | |
| 5,963,131 A | 10/1999 | D'Angelo et al. | |
| 6,028,517 A | 2/2000 | Sansone et al. | |
| 6,047,807 A | 4/2000 | Molbak | |
| 6,055,438 A | 4/2000 | Winner, Jr. | |
| 6,122,625 A | 9/2000 | Rosen | |
| 6,167,378 A | 12/2000 | Webber, Jr. | |
| 6,483,433 B2 | 11/2002 | Moskowitz et al. | |
| 6,487,542 B2 | 11/2002 | Ebata et al. | |
| 6,491,216 B1 | 12/2002 | May | |
| 6,498,603 B1 | 12/2002 | Wallace | |
| 6,526,273 B1 | 2/2003 | Link, II et al. | |
| 6,633,881 B2 | 10/2003 | Drobish et al. | |
| 6,736,314 B2 | 5/2004 | Cooper et al. | |
| 6,788,203 B1 | 9/2004 | Roxbury et al. | |
| 6,845,905 B2 | 1/2005 | Blad | |

(Continued)

FOREIGN PATENT DOCUMENTS

DE 4019265 C1 11/1991

(Continued)

OTHER PUBLICATIONS

Powerpoint Presentation, DTS Product Overview, IFS, Apr. 2006, 17 pages.

(Continued)

*Primary Examiner* — Ella Colbert
*Assistant Examiner* — John Anderson
(74) *Attorney, Agent, or Firm* — Banner & Witcoff, Ltd.; Michael A. Springs

(57) ABSTRACT

The movement of physical cash and/or other monetary items along the cash supply chain requires security. Some security includes the continuous recordation of video or other images to provide a visual history of the activities that occurred at a particular location along the cash supply chain. By automatically identifying an item at various points along the cash supply chain and associating it with a particular timestamp, the relevant portions of the video surveillance may be quickly and efficiently identified when a suspicious event occurs.

21 Claims, 5 Drawing Sheets

U.S. PATENT DOCUMENTS

| | | |
|---|---|---|
| 7,004,385 B1 | 2/2006 | Douglass |
| 7,042,360 B2 | 5/2006 | Light |
| 7,076,458 B2 | 7/2006 | Lawlor et al. |
| 7,201,313 B1 | 4/2007 | Ramachandran |
| 7,212,992 B1 | 5/2007 | Kanevsky et al. |
| 7,216,800 B1 | 5/2007 | Ramachandran |
| 7,243,080 B2 | 7/2007 | Bhadra |
| 7,248,160 B2 | 7/2007 | Mangan et al. |
| 7,284,692 B1 | 10/2007 | Douglass |
| 7,348,886 B2 | 3/2008 | Himberger et al. |
| 7,350,230 B2 | 3/2008 | Forrest |
| 7,375,638 B2 | 5/2008 | Light |
| 7,461,780 B2 | 12/2008 | Potts et al. |
| 7,474,217 B2 | 1/2009 | Himberger et al. |
| 7,577,612 B2 | 8/2009 | Waller et al. |
| 7,588,185 B2 | 9/2009 | Berquist et al. |
| 7,623,033 B2 | 11/2009 | Ainsworth et al. |
| 7,659,816 B2 | 2/2010 | Wandel |
| 7,714,708 B2 | 5/2010 | Brackmann et al. |
| 7,719,423 B2 | 5/2010 | Himberger et al. |
| 7,748,610 B2 | 7/2010 | Bell et al. |
| 2001/0051922 A1 | 12/2001 | Waller et al. |
| 2001/0054643 A1 | 12/2001 | Siemens |
| 2002/0052193 A1 | 5/2002 | Chetty |
| 2002/0052794 A1 | 5/2002 | Bhadra |
| 2002/0091937 A1 | 7/2002 | Ortiz |
| 2002/0095588 A1 | 7/2002 | Shigematsu et al. |
| 2002/0138424 A1 | 9/2002 | Coyle |
| 2002/0194122 A1 | 12/2002 | Knox et al. |
| 2002/0195309 A1 | 12/2002 | Pope |
| 2003/0011466 A1 | 1/2003 | Samuel et al. |
| 2003/0050891 A1 | 3/2003 | Cohen |
| 2003/0061153 A1 | 3/2003 | Birdsong et al. |
| 2003/0083936 A1 | 5/2003 | Mueller et al. |
| 2003/0122671 A1 | 7/2003 | Jespersen |
| 2003/0163710 A1 | 8/2003 | Ortiz et al. |
| 2003/0177102 A1 | 9/2003 | Robinson |
| 2003/0208431 A1 | 11/2003 | Raynes et al. |
| 2003/0213843 A1 | 11/2003 | Jackson |
| 2003/0234719 A1 | 12/2003 | Denison et al. |
| 2004/0056767 A1 | 3/2004 | Porter |
| 2004/0083149 A1 | 4/2004 | Jones |
| 2004/0100379 A1 | 5/2004 | Boman et al. |
| 2004/0111346 A1 | 6/2004 | Macbeath et al. |
| 2004/0124966 A1 | 7/2004 | Forrest |
| 2004/0201454 A1 | 10/2004 | Waterhouse et al. |
| 2005/0091129 A1 | 4/2005 | Tien |
| 2005/0108164 A1 | 5/2005 | Solafia, III et al. |
| 2005/0183928 A1* | 8/2005 | Jones et al. ............ 194/207 |
| 2005/0258234 A1 | 11/2005 | Silverbrook et al. |
| 2005/0273347 A1 | 12/2005 | Dudley et al. |
| 2006/0131395 A1 | 6/2006 | Potts et al. |
| 2006/0247973 A1 | 11/2006 | Mueller et al. |
| 2006/0271441 A1 | 11/2006 | Mueller et al. |
| 2006/0282277 A1 | 12/2006 | Ng |
| 2006/0288233 A1 | 12/2006 | Kozlay |
| 2007/0005452 A1 | 1/2007 | Klingenberg et al. |
| 2007/0008118 A1 | 1/2007 | Kassiedass |
| 2007/0012602 A1 | 1/2007 | Baldassari et al. |
| 2007/0034693 A1 | 2/2007 | Jouvin et al. |
| 2007/0063016 A1 | 3/2007 | Myatt et al. |
| 2007/0174156 A1 | 7/2007 | Emde et al. |
| 2007/0226142 A1 | 9/2007 | Hanna et al. |
| 2007/0282724 A1 | 12/2007 | Barnes |
| 2008/0005019 A1 | 1/2008 | Hansen |
| 2008/0005578 A1 | 1/2008 | Shafir |
| 2008/0103959 A1 | 5/2008 | Carroll et al. |
| 2008/0120237 A1 | 5/2008 | Lin |
| 2008/0149706 A1 | 6/2008 | Brown |
| 2008/0155269 A1 | 6/2008 | Yoshikawa |
| 2008/0199155 A1* | 8/2008 | Hagens et al. ............ 386/124 |
| 2008/0223930 A1 | 9/2008 | Rolland et al. |
| 2008/0262949 A1 | 10/2008 | Bond et al. |
| 2008/0265019 A1 | 10/2008 | Artino et al. |
| 2008/0303903 A1* | 12/2008 | Bentley et al. ............ 348/143 |
| 2009/0006249 A1* | 1/2009 | Morgan et al. ............ 705/39 |
| 2009/0006250 A1 | 1/2009 | Bixler et al. |
| 2009/0032580 A1* | 2/2009 | Blachowicz et al. ......... 235/379 |
| 2009/0051566 A1* | 2/2009 | Olsen et al. ............ 340/825.49 |
| 2009/0051769 A1* | 2/2009 | Kuo et al. ............ 348/159 |
| 2009/0065573 A1 | 3/2009 | Potts et al. |
| 2009/0107800 A1 | 4/2009 | Nishida et al. |
| 2009/0114716 A1 | 5/2009 | Ramachandran |
| 2009/0164364 A1 | 6/2009 | Galit et al. |
| 2009/0187482 A1 | 7/2009 | Blount et al. |
| 2009/0216662 A1 | 8/2009 | Crist et al. |
| 2010/0052844 A1 | 3/2010 | Wesby |
| 2010/0274723 A1 | 10/2010 | Joab |

FOREIGN PATENT DOCUMENTS

| | | |
|---|---|---|
| DE | 4429815 | 2/1996 |
| DE | 19512045 | 10/1996 |
| DE | 19846452 | 12/1999 |
| DE | 20013021 | 1/2001 |
| DE | 102004039365 | 2/2006 |
| DE | 102005047711 | 4/2007 |
| EP | 1477949 | 11/2004 |
| GB | 2304953 | 3/1997 |
| WO | 99/33040 A | 7/1999 |
| WO | 03/034359 A | 4/2003 |
| WO | 2005041385 | 5/2005 |
| WO | 2005106722 | 11/2005 |

OTHER PUBLICATIONS

Durbin, "Ford's F-150 goes high-tech", retrieved from <http://www.wheels.ca/article/173134>, Feb. 6, 2008, 4 pages.

Monthly Minutes from Banking Technology Operations Standing Committee (BTO), dated Mar. 20, 2007, 2 pages.

Hem, "Adaptation/Loomis cashes in on technology/The armored car company defies obsolescence despite a declining use of coins and bills", Houston Chronicle, retrieved from <http://www.chron.com/CDA/archives/archive.mpl? id=2008_4523451>, Mar. 1, 2008, 2 pages.

Powerpoint Presentation, Guck, "PakTrak", Cash Shipment Package Tracking Concept Overview, Draft-Version 1.0, Mar. 14, 2008, 17 pages.

Powerpoint Presentation, RFID in Banking, May 21, 2008, 12 pages.

Monthly Minutes for RFID SIG dated Mar. 19, 2008, 2 pages.

Non-Final Office mailed Mar. 8, 2010 issued in related U.S. Appl. No. 12/262,908.

Non-Final Office mailed Mar. 12, 2010 issued in related U.S. Appl. No. 12/263,041.

International Search Report and Written Opinion from corresponding PCT Application No. PCT/US2009/047452 mailed on Aug. 25, 2009.

Office Action from related U.S. Appl. No. 12/262,432 mailed Dec. 7, 2010, pp. 1-13.

Office Action from U.S. Appl. No. 12/263,041, mailed Sep. 2, 2010.

Office Action from related U.S. Appl. No. 12/262,526 mailed Sep. 16, 2010, pp. 1-12.

Office Action from related U.S. Appl. No. 12/262,532 mailed Nov. 26, 2010, pp. 1-8.

Office Action from related U.S. Appl. No. 12/262,526 mailed Nov. 23, 2010, pp. 1-10.

Office Action from related U.S. Appl. No. 12/262,534 mailed Jun. 24, 2010 (17 pages).

Office Action from related U.S. Appl. No. 12/262,432 mailed Aug. 18, 2010 (12 pages).

Office Action from related U.S. Appl. No. 12/262,908 mailed Aug. 23, 2010 (12 pages).

Office Action from related U.S. Appl. No. 12/262,928 mailed Nov. 10, 2010, pp. 1-14.

Office Action from related U.S. Appl. No. 12/262,523 mailed Nov. 9, 2010, pp. 1-9.

Office Action from related U.S. Appl. No. 12/263,115 mailed Nov. 16, 2010, pp. 1-11.

Non-Final Office Action mailed Feb. 3, 2011 issued in related U.S. Appl. No. 12/262,522.

Office Action from U.S. Appl. No. 12/263,041, mailed Jan. 26, 2011.

Office Action from related U.S. Appl. No. 12/262,472 mailed Oct. 18, 2010, pp. 1-7.

* cited by examiner

CASH SUPPLY CHAIN SURVEILLANCE

CROSS-REFERENCE TO RELATED APPLICATIONS

This application claims priority to U.S. provisional patent application Ser. No. 61/061,987, filed Jun. 16, 2008, entitled "Cash Supply Chain Improvements," hereby incorporated herein by reference as to its entirety.

FIELD OF THE TECHNOLOGY

Aspects of the disclosure relate to cash supply chain surveillance. More specifically, aspects of the disclosure describe using automatic identification techniques to quickly and efficiently identify relevant portions of video surveillance taken of an item along the cash supply chain.

BACKGROUND

The cash supply chain is manual, complex, has inherent risk issues, and is dispersed throughout a network of customers, armored carriers, the Fed (Federal Reserve), and/or a network of client facing devices including but not limited to automatic teller machines (ATMs), cash vaults, banking centers, safes, cash recyclers, and other cash handling devices. The costs of depositing, distributing, and managing cash across a major bank, as well as the amount of daily excess cash carried by such a bank, can be on the order of billions of dollars.

Today's client deposit process does not adequately allow clients to view the status of their deposit bag as it makes its way from the client's site where the deposit was prepared to the bank or bank's representative who will continue the processing of the deposit. Deposit bags are handled multiple times in the current process (and possibly by many different parties), which increases potential errors and complicates finding missing deposits or understanding where errors occurred and assigning fiduciary responsibility for those errors. Pertinent pieces of deposit data are typically manually entered and reentered into various systems throughout the end-to-end processing of the deposit. The collaboration and sharing of information across multiple organizations and with multiple vendors may make this process very complex and increases risk to the bank and bank clients.

Sometimes anomalies and/or other suspicious events occur that risk the security of the cash involved in the cash supply chain. These events must be investigated to prevent permanent loss of the physical cash itself and/or comprise the integrity of the cash supply chain system or any confidential data associated therewith. In some circumstances, these suspicious events are merely accidents or oversights that lead to the misplacement of physical cash. Other times, the suspicious events are deliberate thefts of the physical cash. In either instance, an investigation is usually commenced upon the discovery that a suspicious event has occurred, is occurring, and/or is about to occur. The investigation aims to recover the lost/stolen physical cash, identify the problem or source of the suspicious event, or identify the thief of the physical cash.

Suspicious events are often unpredictable and therefore video is usually recorded in the financial institution's cash vault. In essence, the video surveillance records the video as a pre-emptive measure to a suspicious event. Once the suspicious event occurs, the cause or source of the suspicious event may be hard to determine without video documentation of the happenings surrounding the event and/or leading up to the event. This system results in a high quantity of relatively irrelevant video that is recorded during normal operations and small quantities of highly relevant and useful data that are recorded during the suspicious event.

When an event occurs somewhere in the cash vault, each moment of the video must be reviewed to identify the cause or source of the problem. Reviewing all of the video is a monumental task. Hours upon hours of video may need to be reviewed during this process. Unfortunately, most of the video is not relevant to the suspicious event and very little, if any, correlation exists between the video and the cash vault process. The video and the cash vault process function independently, even though they are highly related. These challenges make the review of the video surveillance very cumbersome, time-consuming, and inefficient. To reduce the amount of time that is required to review the video, teams of people are often charged with the task of reviewing the video. Such a dedication of personnel increases costs and the risk of errors.

Therefore, advancements in the art of video surveillance within the cash vault, and event along other portions of the cash supply chain would be welcomed.

SUMMARY

Aspects as described herein are directed to tracking monetary packages, which may contain monetary items such as foreign and domestic government-issued legal-tender paper currency, coins, checks, coupons, food stamps, credit cards, negotiable money orders, and/or other negotiable instruments as well as non-negotiable collateral information, throughout the cash supply chain. In carrying out daily financial transactions, it is typical for monetary packages to be physically transferred between various parties, such as but not limited to a bank client (or a client of another financial institution who is leveraging the services of the bank), a transporter (e.g., an armored carrier), a bank vault, and even various stations within a bank vault. This transfer amongst various parties is referred to as the cash supply chain. Because many types of cash are reusable/recyclable, the same physical cash is usually cycled through the cash supply chain multiple times.

For transport through the cash supply chain, a financial transaction such as a deposit including one or more monetary items is normally bundled or otherwise packaged together as a package. Depending upon the location within the cash supply chain, the monetary package may maintain together a quantity of monetary items as a single entity by way of, e.g., a bag (in which the monetary items are placed within the bag, which may be sealed), by way of a cassette for holding the monetary items, and/or by way of one or more straps (which may also be within the bag).

While a number of techniques to automate transaction handling have been attempted, there remains a need to increase the efficiency and accuracy of the financial transaction process. Consequently, it is desirable to increase the speed and accuracy of the financial transactions and to reduce the labor required to perform the transactions. It is also desirable to make information relating to the financial transaction rapidly available to the client, third party vendors, and the bank, and to identify more quickly problematic locations in the financial transaction, identify potential theft, fraud or embezzlement, and identify industry trends. Information about a deposit or withdrawal, for instance, should be provided in an expeditious fashion as it is processed along a cash supply chain, where notification/reporting is customizable and automatic for enhancing the client's experience and for improving internal processes of a bank.

According to further aspects, monetary packages are tracked via a centralized tracking system that communicates with the various parties handling the monetary packages throughout the entire supply chain and/or when a carrier is set to arrive. Each time a monetary package changes status in the cash supply chain (e.g., transfers from one party to another or changes physical location), an involved party (e.g., the party receiving the monetary package and/or the party providing the monetary package) updates the centralized tracking system with the status. The centralized tracking system may be updated using a network of automated sensors that do not necessarily require the intervention of a party to create the update. These updates may be communicated to the centralized tracking system (system of record) in real time or near real time. Such a centralized tracking system may allow the bank or other service provider to offer a variety of services to the client.

For instance, centralized monetary package tracking may allow for more accurate reporting of monetary package status. And, by pre-scheduling (initiation) of deposits and change orders into the centralized tracking system, anomalies in the transport of a monetary package (e.g., a lost or delayed monetary package) may be recognized much earlier, even prior to actual deposit or arrival of the package at the processing site.

Another potential benefit of centralized monetary package tracking may include improved monitoring of events along the cash supply chain. Events along the cash supply chain may be tracked for security purposes and information relating to the events may be collected. For example, a financial institution, such as a bank, may conduct business with a customer, another financial institution, the Federal Reserve Bank, or any other entity, in which physical cash is transported between the entities and handled by various people.

Security may be provided at any a plurality of surveillance points along the cash supply chain. One method of conducting such cash supply chain surveillance includes the steps of: (1) automatically identifying an item at a surveillance point along the cash supply chain; (2) assigning a timestamp for the item at the surveillance point; (3) recording surveillance video of the surveillance point; and (4) identifying a portion of the surveillance video that corresponds to the timestamp. Such a cash supply chain surveillance process may reduce the amount of time that is required to identify relevant portions of the large quantities of video surveillance that is recorded at a surveillance point.

This video surveillance system may be implemented in a computing environment that may automatically identify an item when it arrives at a surveillance point along the cash supply chain. The identification of such items may be performed by an RFID system in which an RFID scanner that is positioned at or near the surveillance point may detect the presence of an RFID tag when it arrives at a surveillance point. At each point of surveillance, video may be continuously or selectively recorded. When an event becomes apparent, a period of time is identified during which the item involved in the event was within the cash supply chain. Relevant portions of the video surveillance may be identified quickly and efficiently by focusing on the corresponding time during which the video surveillance was recorded. One or more video cameras may be involved in recording the video surveillance.

An event may be an anomaly, a suspicious event, a theft, a disappearance, or any other triggering event. The event may include a discrepancy between a paper ledger and the manual count of the contents of a cash bag. The event may also include the discovery that a cash bag entered a surveillance point, but never emerged from the surveillance point. Any trigger may be used to indicate that an event occurred.

These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

Figure 1:
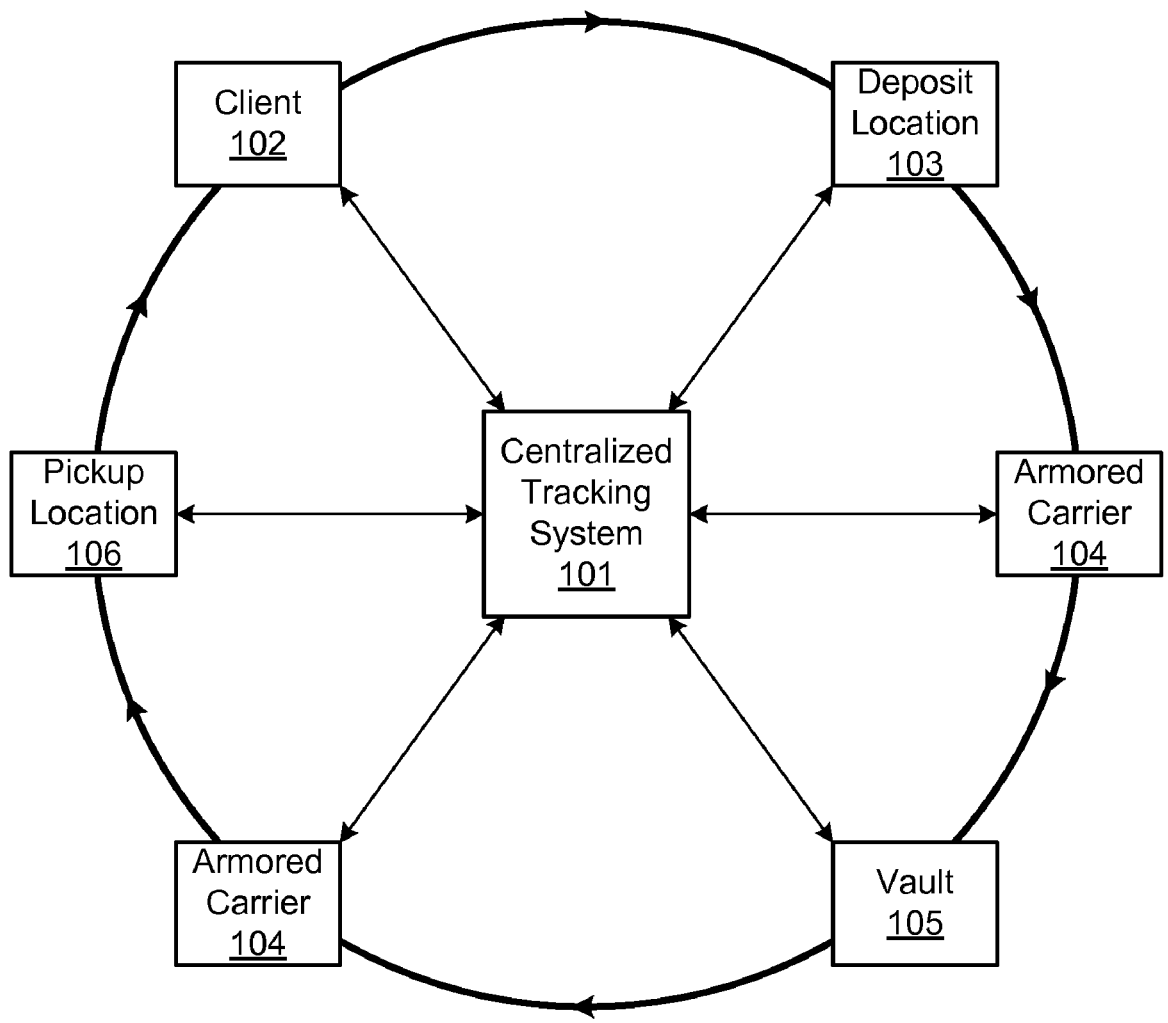
FIG. 1 is a graphical depiction of an illustrative cash supply chain for a deposit/withdrawal lifecycle, including a centralized tracking system.

FIG. 1 is a graphical depiction of an illustrative cash supply chain for a monetary item deposit/withdrawal lifecycle. In this example, a centralized tracking system 101 communicates with various parties, such as a bank client 102, a deposit location 103, an armored carrier 104 or other transport service, a bank vault 105, and a pickup location 106. Communication between centralized tracking system 101 and the various parties 102-106 may be performed across any one or more communication media. Examples of communication media include, but are not limited to, a network such as the Internet, a local-area network or LAN, a wireless LAN or WLAN, and/or a telephone network such as a landline telephone network and/or a cellular telephone network. Other examples of communication media include a dedicated landline link and/or satellite or other wireless link. While not explicitly shown, items may be processed internally within a node (e.g., within bank vault 105). Consequently, each node may have a network within itself.

Centralized tracking system 101 may include at least one computing device and at least one computer-readable medium that, together, are configured to receive monetary package status reports from parties such as parties 102-106, maintain data representing the monetary package status, and generate reports and alert messages from that monetary package status data. A "computing device" as referred to herein includes any electronic, electro-optical, and/or mechanical device, or system of physically separate such devices, that is able to process and manipulate information, such as in the form of data. Non-limiting examples of a computing device includes one or more personal computers (e.g., desktop or laptop), servers, personal digital assistants (PDAs), ultra mobile personal computers, smart phones, cellular telephones, pagers, and/or a system of these in any combination. In addition, a given computing device may be physically located completely in one location or may be distributed amongst a plurality of locations (i.e., may implement distributive computing). A computing device may even be a mobile device. Centralized tracking system 101 may further support co-operation with other non-bank tracking systems.

A computing device typically includes both hardware and software. The software may be stored on a computer-readable medium in the form of computer-readable instructions. A computing device may read those computer-readable instructions, and in response perform various steps as defined by those computer-readable instructions. Thus, any functions attributed to a computing device as described herein may be defined by such computer-readable instructions read and executed by that computing device, and/or by any hardware (e.g., a processor) from which the computing device is composed.

The term "computer-readable medium" as used herein includes not only a single medium or single type of medium, but also a combination of one or more media and/or types of media. Such a computer-readable medium may store computer-readable instructions (e.g., software) and/or computer-readable data (i.e., information that may or may not be executable).

Referring again to FIG. 1, bank client 102 may include not only registered customers of a bank that have a financial account (e.g., checking or savings account) maintained by the bank, but also customers that do not have a financial account with the bank but are otherwise doing business with the bank. Clients may also be another bank or a bank agent or business partner including local, state, or federal governments, and may also be extended to include a chain of a bank's customer's customers. As will be discussed, bank client 102 may receive a notification of an event along the cash supply chain at phone 102a or terminal 102b through a wireless network or the Internet.

Deposit location 103 is the location at which client 102 releases custody of the deposit (such as in the form of a monetary package). This custody may be released by, for instance, depositing the monetary into a cash handling device (e.g., a cash recycler, depository, exchange, dispensing machine, or ATM), or at a bank teller, or even at the client's own location where an armored carrier would pick up the deposit from the client. Pickup location 106 is the location at which client 102 receives custody of the monetary items (which may or may not be prepared by client 102 and which may be in the form of a monetary package), such as from an armored carrier, bank teller, or cash handling device.

Vault 105 is typically a secured location or device in a bank or customer's office where the deposit is processed. In the case of a vault in an armored carrier's or bank's facility, once the deposits are processed, currency or other monetary items are strapped for storage and distribution. A vault may not only process incoming monetary items but may also provide monetary items such as currency to clients. These requests for currency, commonly called "change orders," are generally standing orders for specific amounts that are sent on a specific schedule, but can be on-demand or non-standing orders that are requested for a specific time. With some embodiments, currency may be verified by the one transporting the currency. This may be because the carrier is trusted and in an appropriate liability agreement with the bank, or the bank owns a carrier. In that case, some or all of the funds may be verified (or trusted due to the device the funds came from) and re-used in the cash supply chain without going to the vault. For example, the carrier may use a hand-held device to check the next location to visit or receive notices that a site needs cash. The carrier may use the verified cash to fulfill the order.

Armored carrier 104a/104b (which may be referred to as a "vendor") transports monetary packages between different stages along the cash supply chain typically in an armored vehicle. The physical transportation could be any type of transportation, however, including a courier or package delivery service with a secured package.

Parties 102-106 may communicate with centralized tracking system 101 over corresponding communications channels. Different types of communications channels may be supported. For example, centralized tracking system 101 may communicate with client 102 through a computer terminal (via the Internet) and/or a wireless telephone, with an armored carrier through a handheld scanner with a wireless communications interface, and with a bank employee through a work station (e.g., via an intranet). A communications channel may utilize different communications media, including a wired telephone channel, wireless telephone channel, and/or wide area channel (WAN).

Figure 2:
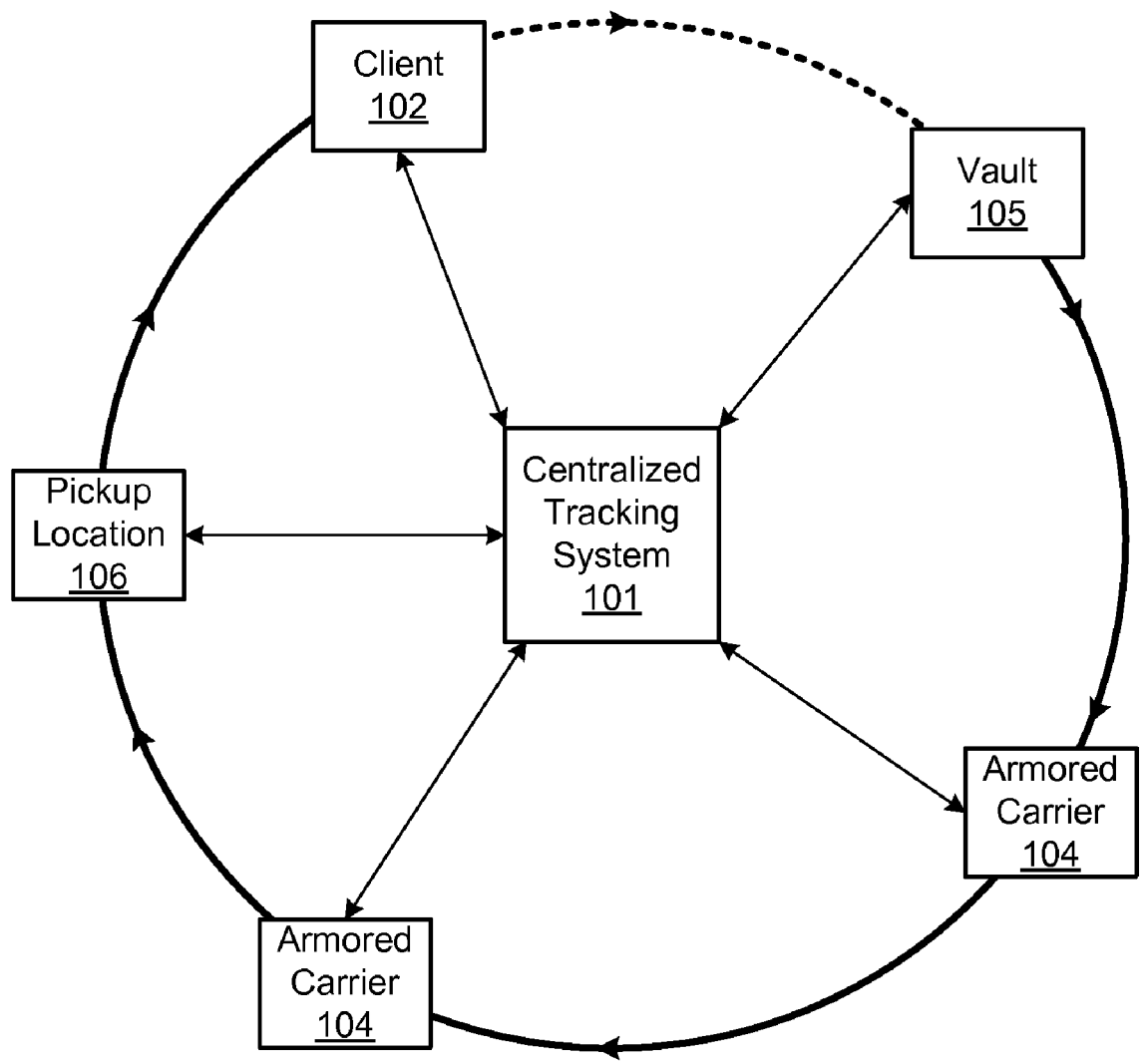
FIG. 2 is a graphical depiction of an illustrative cash supply chain for a change order lifecycle, including a centralized tracking system.

FIG. 2 is a graphical depiction of an illustrative cash supply chain for a change order lifecycle. A change order is a financial transaction in which a client (such as client 102) requests and receives a predefined sum in a predefined set of one or more denominations. For example, client 102 might request a particular amount of currency with X amount of ten dollar bills, Y amount of twenty dollar bills, and Z amount of one dollar bills. While any type of client may implement a change order, this type of transaction is particularly common for business clients that require a certain amount of currency in hand each day for their cash registers. With some embodiments, a change order may be initiated by the bank using forecasting systems for cash handling devices.

As can be seen in FIGS. 1 and 2, a monetary package transfers from party to party, with the exception of the broken line in FIG. 2 that indicates a request by client 102 rather than a physical transfer of a monetary package. Each time the monetary package changes hands and/or changes physical locations, centralized tracking system 101 may be updated. A physical location may two different nodes, or within the same node, of the cash supply chain. For example, monetary items are typically moved from receiving of a vault to a teller of the vault. In addition, any of these parties (or even other parties not shown) may at any time query centralized tracking system 101 to determine the current status, historical status, and planned future status of the monetary package. To aid in tracking monetary packages, each monetary package may physically include an identifying device having an associated identifier that is unique to that monetary package. The identifying device may be any device that stores human-readable and/or computer-readable information on some type of medium. Examples of such an identifying device include a radio-frequency identification (RFID) tag or other wirelessly readable tag, a bar code or other visual label, or printed ink made directly on or in the monetary package. The identifier itself may be made up of any one or more symbols that together make up a unique combination, such as one or more numbers, letters, icons, dots, lines, and/or any one-, two-, or higher-dimensional patterns.

Figure 3:
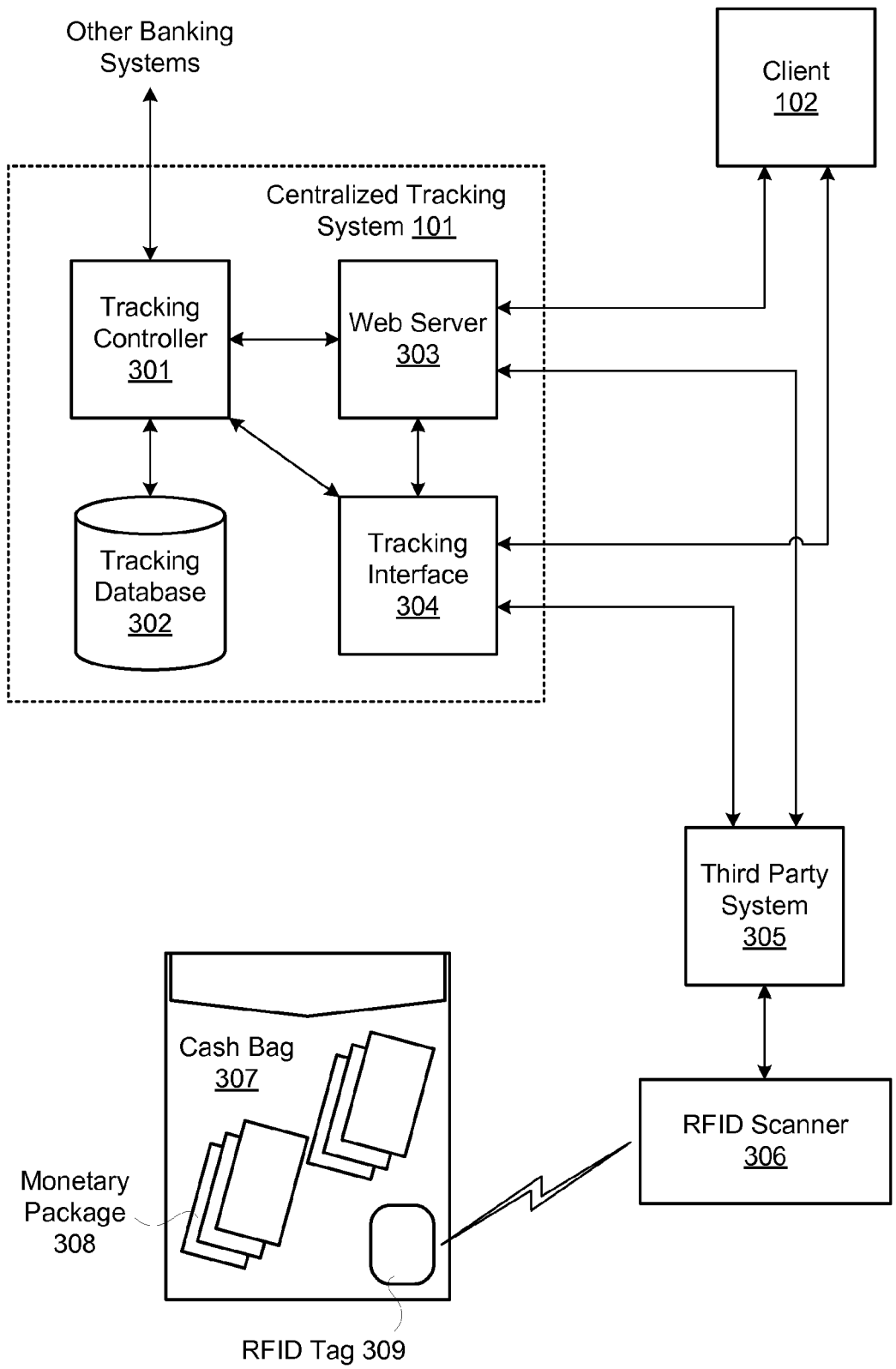
FIG. 3 is a functional block diagram of an illustrative monetary package tracking environment.

FIG. 3 is a functional block diagram of an illustrative monetary package tracking environment. In this example, centralized tracking system 101 is shown to include a tracking controller 301, tracking database 302, a web server 303, and a tracking interface 304. Each of units 301, 303, and 304 may be implemented as or otherwise include a computing device. It should be noted that the divisions between functional blocks in FIG. 3 is merely illustrative, and that the physical division of computing devices and other equipment may be different from the functional division. Moreover, some or all of the functional blocks may be combined or further subdivided functionally and/or physically.

Tracking database 302 may be implemented as or otherwise include a computer-readable medium for storing data.

This data may be organized, for instance, as a relational database that is responsive to queries such as structured query language (SQL) queries. Tracking database 302 may be distributed and may collaborate with internal and/or external sources to fulfill the completeness of the data utilized for notifications.

In this example, tracking controller 301 may be configured to add, edit, update, delete, and query data stored in tracking database 302. The data stored in tracking database 302 may include, for instance, data indicating the current status of each of a plurality of monetary packages. For example, the data may indicate that a given monetary package is with a particular armored carrier, and that it was transferred to the armored carrier at a certain time on a certain date. The status data may be associated with the unique identifier of the relevant monetary package.

Web server 303 may be configured to generate an Internet web page that is accessible by client 102 and/or other parties. The web page may be used to query tracking database 302 via tracking controller 301. For example, a party using the web page may be able to enter an identifier associated with a monetary package. In response, web server 303 may request tracking controller 301 to query tracking database 302 (or alternatively web server 303 may generate the query itself) for that identifier. The query response is forwarded by tracking controller 301 to web server 303, and displayed on the web page for review by the party. The query response may include, for instance, the status data associated with the identifier. Many other types of query transactions are possible. In addition, updates, deletions, and additions may be made to the data in tracking database 302 via the web page generated by web server 303. For example, a party may desire to update status information about a particular monetary package via the web site, or may desire to add a new monetary package with a new identifier not previously included in tracking database 302.

Tracking interface 304 may be used as an alternative interface into tracking controller 301 and tracking database 302, without the need for an Internet web page. For example, data and queries may be provided to tracking controller 301 via tracking interface 304 using a short messaging system (SMS) message or other type of messaging from a cellular telephone.

FIG. 3 further shows an example of a third party system 305 (e.g., the computer system of armored carrier 104). System 305 may be embodied as or otherwise include a computing device, and may further include or be coupled with an identifier reader such as an RFID scanner 306 or a bar code reader. In this example, RFID scanner is configured to read an RFID tag 309 that is contained inside or otherwise attached to a bag 307 that also contains a quantity of monetary items 308. Using such a setup, the third party may, for example, read the identifier stored in RFID tag 309 using RFID scanner 306 (which may be a handheld or fixed location device), forward that identifier to tracking interface 304 or web server 303 along with the current status of bag 307 (e.g., in custody of the bank vault at a certain time and date). This current status may be added to the data in tracking database 302 and associated with the identifier. Then, when that party or another party later queries tracking database 302 for the same identifier, the status of bag 307, including the most recent status discuss above, may be returned in response to the query.

RFID tag 309 may be a passive RFID tag that does not contain its own power source. Rather, a passive RFID tag (e.g., its memory, controller, and transmitter) is powered by power inherent to a signal that is received from RFID scanner 306 or another signal source. Alternatively, RFID tag 309 may be an active RFID tag that contains its own power source.

The above discussion in connection with FIGS. 1-3 describes but a few examples of how monetary package tracking might be implemented. These and other implementations, as well as various features that may be provided in connection with monetary package tracking, will be discussed in further detail below.

Figure 4:
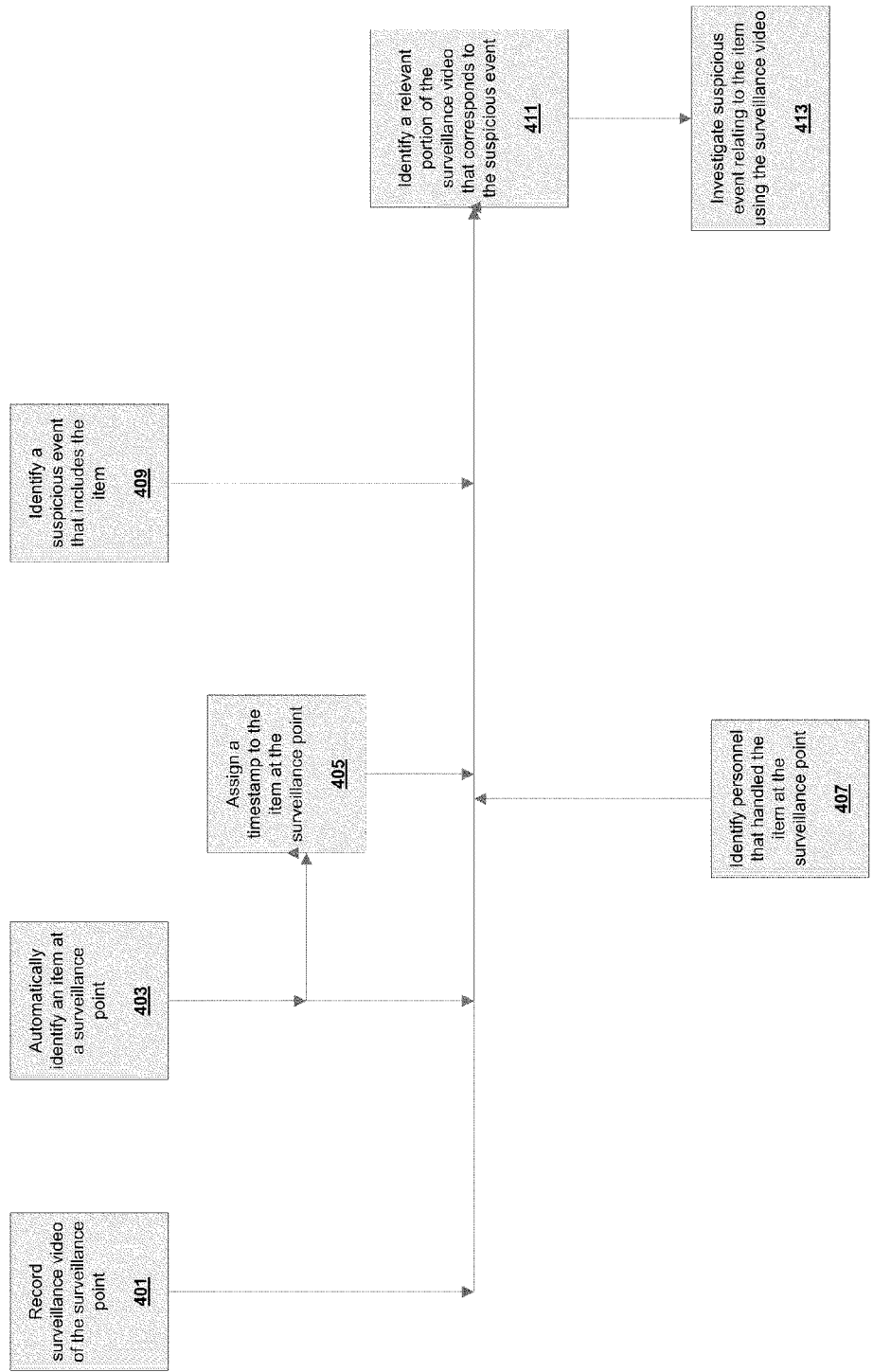
FIG. 4 is an illustrative method of conducting cash supply chain surveillance.

FIG. 4 depicts steps in an illustrative method of providing cash supply chain surveillance. At any point along the cash supply chain and/or within the central tracking system described above, security measures may be conducted to prevent loss, theft, errors, and the like. Some example security measures would include conducting video surveillance at various points along the cash supply chain, as illustrated in FIG. 4 at step 401. The video surveillance may provide valuable visual documentation of the events that occur at the various points along the cash supply chain. Such video surveillance may be very useful during an investigation of an event that included one of the items in the cash supply chain.

The video surveillance may be continuously recorded or may be recorded at specific times. For example, an ATM may continuously record video of the ATM and any customers or personnel that interact with the ATM. Video surveillance may be used to identify theft of the physical cash, damage to the ATM, discrepancies of amounts of physical cash, and other anomalies that occur at the ATM. A cash vault may also have video surveillance at various locations within the cash vault. The video surveillance may or may not be recorded when a person enters the cash vault and may not be recorded when no activity is occurring in the cash vault or no people are in the cash vault.

One or more points along the cash supply chain may be identified as surveillance points at which a video surveillance camera may be positioned. A surveillance point may be any portion or physical location along the cash supply chain that may benefit from video documentation of the actions and events occurring at the location. For example, a surveillance point may be an ATM, a loading area for an armored carrier, a customer/client site, a location within a cash vault, a financial institution, and any other suitable location at which video surveillance may be useful if an event relating the physical cash occurs. The surveillance point may be at a fixed location, or it may be mobile. For instance, the surveillance point may be the armored carrier's truck (e.g., a video camera attached to the truck). The surveillance point may also be any point along the cash supply chain, such as a customer location, a deposit processing location, change ATM, cash recycler, or any other cash handling device.

As described above, an item may be tracked along the cash supply chain. The item may be physical cash, a cash strap and/or cash bag containing physical cash and other negotiable instruments, a credit or debit card, a person, an armored carrier, a cash cart, cash table, and any other physical item that may exist within the cash supply chain. Each item may be identified at a surveillance point along the cash supply chain.

In some examples, the items may be automatically identified at each surveillance point, as illustrated in step 403 of FIG. 4. One example system that automatically identifies an item includes an RFID system, as described above. An RFID tag may be attached to the item and an RFID scanner may be positioned at each surveillance point. When the item arrives at the surveillance point, the RFID tag may transmit an electronic signal containing identifying information (i.e., an identifier) to the RFID scanner, as described in the system above.

The item may also be assigned a timestamp representing a time when it is physically present at the surveillance point, as illustrated in FIG. 4 at step 405. The timestamp may indicate a time and/or date that the item arrived and/or departed from the surveillance point. The timestamp may also indicate the person or group of personnel that handled the item at the surveillance point, such as illustrated by step 407. The term "timestamp" is used broadly herein, and may include not only an indication using time-based units, but also an index in general that changes over time and that relates to a particular start and/or end point in the surveillance video.

During the course of the cash supply chain, an event may be identified, as illustrated in step 409 of FIG. 4. For example, cash may disappear or be reduced in amount as a result of errors by the personnel handling the cash and/or theft. An event occurs anytime the cash is not present in its expected form in its expected location. The financial institutions may maintain a log of the cash as it is moved along the cash supply chain and may expect a particular quantity of cash to be present at a surveillance point along the cash supply chain at a particular time. Any event may have caused such a discrepancy such as a system delay, a theft, a personnel error, or the like.

When such a discrepancy occurs, an alert may be triggered that indicates that an investigation or other inquiry may be commenced to resolve the discrepancy. The discrepancy may be identified as being related to one or more items along the cash supply chain. Such an event may be associated with a particular period of time. As illustrated in step 411 of FIG. 4, the period of time during which the event occurred may be correlated to (e.g., matched up with) the timestamp of the item as it is being tracked along the central tracking system. This correlation may reduce the quantity of video surveillance corresponding to the timestamp that would need to be reviewed in order to identity the video surveillance that is relevant to the event. The quick identification of the relevant portion of the video surveillance may facilitate investigation of the event, as illustrated in step 413 of FIG. 4, and ultimately lead to an identification of the cause of the event. Once the cause of the event is known, the problem may be resolved quickly.

Figure 5:
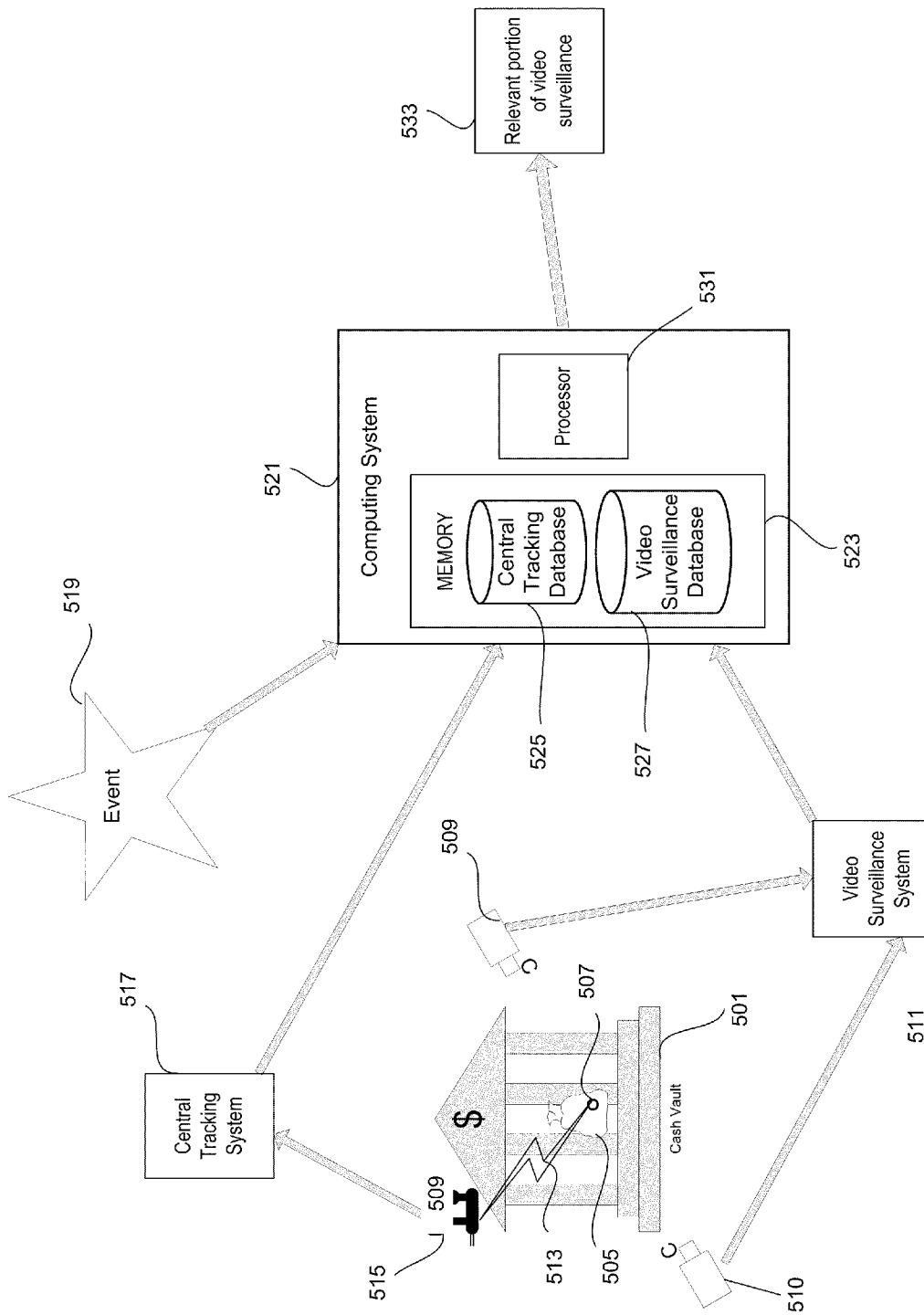
FIG. 5 illustrates an example cash supply chain surveillance system.

FIG. 5 illustrates an example cash surveillance system including a cash vault 501 that is integrated to a central cash supply chain. A cash bag 505 having an RFID tag 507 may arrive at the cash vault 501 that has first video surveillance camera 509 and a second video surveillance camera 510 that each record video data. The first video surveillance camera 509 and the second video surveillance camera 510 may be positioned at various locations within the cash vault 501. The first video surveillance camera 509 and the second vide surveillance camera 510 also may be positioned to record video of the same location, but from two different angles. The first video surveillance camera 509 and the second video surveillance camera 510 may be positioned to record video of any location, item, person, or the like within the cash supply chain.

In the example illustrated in FIG. 5, the transfer of custody (not shown) between a first position and a second position with the cash vault 501 may be recorded by the video surveillance system 511 and stored in a video surveillance database 527 in the computing system memory 523. When the cash bag 505 arrives, the RFID tag 507 transmits an electronic signal 513 to an RFID scanner 515 that includes identifying information about the cash bag 505. The identifying information may include a unique identifier, such as alphanumeric text, a bar code, or other electronic data that distinguishes the cash bag 505 from other monetary packages. When the electronic signal 513 is transmitted to the RFID scanner 515, a timestamp may be assigned that identifies, e.g., the time and/or date at which the cash bag 505 arrived at the cash vault 501. The timestamp data may be tracked by the central tracking system 517 and stored in the central tracking database 525 of the computing system's memory 523.

An event 519 relating to the cash bag 505 may occur at any point in the cash supply chain. Such an event 519 may be identified as relating to the cash bag 505 and/or a specific time, time period, date, or other time-related quantity. The timestamp information relating to tracking of the cash bag 505 along the cash supply chain may identify the relevant portions of the video surveillance. For example, if an event occurred between a first time and a second time, the video surveillance for the time period occurring between the first time and the second time may be reviewed for clues to the investigation of the event. In some examples, the video surveillance may indicate the cause of the event and may lead to the resolution the problem.

As illustrated in FIG. 5, the relevant portion of the video surveillance 533 may be identified. When the relevant portion of the video surveillance is identified 533, the irrelevant portions, such as those portions of the video surveillance that do not provide insight or clues to assist in the resolution of the event, are not required to be reviewed. Thus, only a small quantity of video surveillance that may provide clues and/or insight into the resolution of the event may be analyzed.

FIG. 5 illustrates the cash supply chain video surveillance implemented within a computing system 521. The computing system 521 includes a memory 523 and a processor 531. The memory may include the central tracking database 525 and the video surveillance database 527 that may be in communication with the central tracking system 517 and the video surveillance system 511, respectively. When an event 519 occurs, the processor 531 may receive information from the central tracking database 525, the video surveillance database 527 and information about the event 519. The processor 531 may be configured to analyze this information and identify the relevant portions of the video surveillance 533 based on the timestamp information and/or the identification information of items as they move through the cash supply chain.

Any portion or all portions of the cash supply chain video surveillance may be computerized. The video surveillance may be performed by a digital video recorder and may be transmitted to the computing system over a computing network. The central tracking may also be performed by a computing system. Both the video surveillance system and the central tracking computing system may be part of a larger cash supply chain management computing system. Within each computing system, software may be implemented to instruct computing components to perform the functions and analyze the data in a particular fashion, such as analyzing the data with a particular algorithm defined by a set of computing instructions.

Video surveillance may be searchable on a computing system. The video and/or audio recorded at a surveillance point may be able to track a particular item throughout the entire cash supply chain process. The computing system may also be able to piece together segments of video surveillance from more than one surveillance point. For example, a cash bag may be lost or stolen at a point along the cash supply chain. Video of the cash bag being handled at each surveillance point at which the cash bag was detected may be compiled. The detection of the cash bag may be performed by the RFID system described above.

In another example, a particular employee may have caused a security breach or other anomaly. Video of the particular employee may be traced at each surveillance point having video surveillance at which the particular employee was detected (the RFID tag attached to the particular employee may be detected and tracked). Similar to the example above, the video clips of each surveillance point that the particular employee visited would be compiled for the investigation into the anomaly. A pathway of any item or person within the cash supply chain would be able to be tracked and video of the pathway would be able to be compiled by the computing system.

Additionally, the compiled videos relating to a particular item within the cash supply chain may be accessible by a website. A user may be able to access the website and view the video pathway for a particular item. The website may also provide a search feature that receives information from a user about the video pathway relating to the item that the user would like to view. For example, the user may wish to view the compiled video pathway of a person, machine, video surveillance camera, customer, etc. The user may enter information on the website regarding an automatic identification tag number associated with the item, a person's name, or other identifying information. The computing system may compile the associated video surveillance and make it accessible for viewing by the user via the website. Any suitable search criteria may be offered.

While the invention has been described with respect to specific examples, those skilled in the art will appreciate that there are numerous variations and permutations of the above described systems and methods. Thus, the spirit and scope of the invention should be construed broadly as set forth in the appended claims.

We claim:

1. A computer-assisted method of conducting cash supply chain surveillance, comprising the steps of:
   receiving identification of an item at a surveillance point along a cash supply chain from a third party computing device, wherein the identification comprises a timestamp assigned by the third party computing device for the item at the surveillance point;
   receiving a surveillance video of the surveillance point, the surveillance video recorded with a video camera and including surveillance during a time period corresponding to the timestamp;
   receiving information relating to an event that included the item, wherein the receiving occurs via short message service (SMS);
   storing the identification of the item, the surveillance video of the surveillance point, and the information relating to the event in a database;
   using a processor, accessing the surveillance video at the timestamp to determine a cause of the event; and
   receiving a first query of a status of the item in the cash supply chain, wherein the status includes at least a current location of the item, a prior location of the item, and a planned future location of the item;
   transmitting a response to the first query;
   receiving a second query to update the current location of the item; and
   updating the current location of the item in response to the second query.

2. The method recited in claim 1, wherein the step of receiving identification of the item comprises receiving identification of the item based on an identifier transmitted by a radio-frequency identification (RFID) tag attached to the item.

3. The method recited in claim 1, wherein the item is a cash bag.

4. The method recited in claim 1, wherein the item is a cash strap.

5. The method recited in claim 1, wherein the surveillance point is within a cash vault.

6. The method recited in claim 1, wherein the surveillance point is an ATM.

7. The method recited in claim 1, wherein the surveillance point is a financial institution.

8. The method recited in claim 1, wherein the surveillance point is an armored carrier.

9. The method recited in claim 1, wherein the timestamp is assigned to include a time that the item arrives at the surveillance point and a time that the item departs from the surveillance point.

10. The method recited in claim 1, further including receiving an identification of personnel that handled the item at the surveillance point, wherein the accessing the surveillance video comprises accessing portions of the surveillance video that include personnel that handled the item at the surveillance point.

11. A computer-readable medium storing computer-executable instructions for performing a method, the method comprising the steps of:
    receiving a video surveillance of an item at a plurality of surveillance points along a cash supply chain over a period of time;
    receiving confirmation that the item has been detected at least one of the plurality of points of surveillance;
    for the at least one of the plurality of points of surveillance, receiving a timestamp for the item corresponding to the item's presence at the at least one of the plurality of points of surveillance;
    receiving information relating to an event that included the item, wherein the receiving occurs via short message service (SMS);
    storing the video surveillance, the confirmation that the item has been detected, the timestamp for the item, and the information related to the event in a database;
    selecting the at least one of the plurality of points of surveillance;
    identifying a portion of the video surveillance relating to the selected at least one of the plurality of points of surveillance by matching the timestamp of the item's presence at the selected at least one of the plurality of points of surveillance with a corresponding portion of the time period over which the video surveillance was recorded to determine a cause of the event;
    receiving a first query of a status of the item in the cash supply chain, wherein the status includes at least a current location of the item, a prior location of the item, and a planned future location of the item;
    transmitting a response to the first query;
    receiving a second query to update the current location of the item; and
    updating the current location of the item in response to the second query.

12. The method recited in claim 11, wherein the step of receiving the video surveillance includes:
    receiving a first video surveillance at a first video camera positioned to monitor a first surveillance point; and
    receiving a second video surveillance at a second video camera positioned to monitor a second surveillance point.

13. The method recited in claim 11, wherein the plurality of surveillance points includes at least one of an ATM, a cash vault, a financial institution, and an armored carrier.

14. The method recited in claim 11, wherein the detection is performed by an RFID system that includes attaching an RFID tag to the item and a plurality of RFID scanners that are positioned at each of the points of surveillance.

15. A method of providing security along a cash supply chain, comprising the steps of:
- receiving, from a third party computing device, a unique identifier associated with an item when the item arrives at a point of surveillance;
- receiving a timestamp of the item from the third party computing device, wherein the timestamp indicates a time that the item arrives at the point of surveillance;
- storing first information relating to the unique identifier and the timestamp in a database of a computing system;
- receiving a video surveillance of the point of surveillance over a period of time, wherein the video surveillance is recorded with a video camera;
- receiving second information relating to an event that included the item, wherein the receiving the second information occurs via short message service (SMS);
- using a processor of the computing system, identifying a time period during which the item was present at the point of surveillance by assessing the first information in the memory;
- using the processor, selecting a relevant portion of the video surveillance that corresponds to the time period during which the item was present at the point of surveillance;
- receiving a first query of a status of the item in the cash supply chain, wherein the status includes at least a current location of the item, a prior location of the item, and a planned future location of the item;
- transmitting a response to the first query;
- receiving a second query to update the current location of the item; and
- updating the current location of the item in response to the second query.

16. The method recited in claim 15, further comprising causing display of the video surveillance of the item that was included in the event.

17. The method recited in claim 16, further comprising the step of identifying a cause of the event.

18. The method recited in claim 15, wherein the point of surveillance includes at least one of a cash vault, an ATM, a financial institution, and an armored carrier.

19. A system for providing cash supply chain surveillance, comprising:
- a video camera capable of recording video at a first location;
- a computing system, comprising:
  - a database for storing item information, timestamp information, and event information;
  - a receiver for receiving:
    - the item information about an item that is present at the first location; and
    - the timestamp information about a time at which the item is present at the first location;
    - the event information relating to an event that included the item, wherein the event information is received via short message service (SMS);
    - a first query of a status of the item in the cash supply chain, wherein the status includes at least a current location of the item, a prior location of the item, and a planned future location of the item;
    - a second query to update the current location of the item, and
  - a processor configured to identify a portion of the recorded video that corresponds to the item information and the timestamp information, transmit a response to the first query, and update the current location of the item in response to the second query, wherein the portion of the video surveillance is relevant to investigating the event that includes the item.

20. The system recited in claim 19, wherein the location is within a cash vault.

21. A computer-assisted method of conducting cash supply chain surveillance, comprising the steps of:
- receiving identification of physical cash at a cash vault along a cash supply chain from a third party computing device based on an identifier transmitted by a radio-frequency identification (RFID) tag attached to the physical cash,
- wherein the identification comprises a timestamp assigned by the third party computing device for the physical cash at the cash vault,
- wherein the timestamp includes a time that the physical cash arrives at the cash vault and a time that the physical cash departs from the cash vault,
- wherein the RFID tag is read by an RFID scanner at the cash vault,
- wherein the identifier comprises alphanumeric characters,
- wherein the RFID tag comprises a passive RFID tag that is powered by power inherent to a signal that is received from the RFID scanner;
- receiving an identification of personnel that handled the physical cash at the cash vault,
- receiving a surveillance video of the cash vault, the surveillance video recorded with a video camera and including surveillance during a time period corresponding to the timestamp;
- receiving information relating to an event that included the physical cash,
- wherein the receiving occurs via short message service (SMS),
- wherein the event includes disappearance of the physical cash from the cash vault;
- storing the identification of the physical cash, the identification of the personnel that handled the physical cash, the surveillance video of the cash vault, and the information relating to the event in a database,
- wherein the database is organized as a relational database that is responsive to requests in structured query language, wherein the database comprises a distributed database;
- generating an alert in reaction to the event;
- using a processor, accessing the surveillance video at the timestamp to determine a cause of the event,
- wherein the accessing the surveillance video comprises accessing portions of the surveillance video that include personnel that handled the physical cash at the cash vault;
- generating a web page configured to allow a user to query a status of the physical cash in the cash supply chain, wherein the status includes at least a current location of the physical cash, a prior location of the physical cash, and a planned future location of the physical cash,
- wherein the web page is further configured to allow the user to access the surveillance video;
- receiving a first query of the status of the physical cash in the cash supply chain through the web page;
- transmitting a response to the first query;
- receiving a second query to update the current location of the physical cash; and
- updating the current location of the physical cash in response to the second query.

* * * * *